(12) United States Patent
Schink et al.

(10) Patent No.: US 12,444,805 B2
(45) Date of Patent: Oct. 14, 2025

(54) BATTERY ARRANGEMENT COMPRISING A POSITIONING ELEMENT AND ADAPTOR PLATE

(71) Applicant: Webasto SE, Stockdorf (DE)

(72) Inventors: Michael Schink, Stockdorf (DE); Tobias Tofaute, Stockdorf (DE); Jochen Haussmann, Stockdorf (DE)

(73) Assignee: Webasto SE, Stockdorf (DE)

( * ) Notice: Subject to any disclaimer, the term of this patent is extended or adjusted under 35 U.S.C. 154(b) by 1053 days.

(21) Appl. No.: 17/598,724

(22) PCT Filed: Mar. 30, 2020

(86) PCT No.: PCT/EP2020/058967
§ 371 (c)(1),
(2) Date: Sep. 27, 2021

(87) PCT Pub. No.: WO2020/193805
PCT Pub. Date: Oct. 1, 2020

(65) Prior Publication Data
US 2022/0173477 A1    Jun. 2, 2022

(30) Foreign Application Priority Data
Mar. 28, 2019 (DE) .................. 10 219 107 991.8

(51) Int. Cl.
*H01M 50/291* (2021.01)
*H01M 50/204* (2021.01)
(Continued)

(52) U.S. Cl.
CPC ....... *H01M 50/291* (2021.01); *H01M 50/204* (2021.01); *H01M 50/242* (2021.01);
(Continued)

(58) Field of Classification Search
CPC ............ H01M 50/291; H01M 50/289; H01M 50/242; H01M 50/258; H01M 50/204; H01M 50/503
See application file for complete search history.

(56) References Cited

U.S. PATENT DOCUMENTS

2002/0192543 A1    12/2002  Heimer
2003/0003350 A1    1/2003   Heimer et al.
(Continued)

FOREIGN PATENT DOCUMENTS

DE           2551663 A1     5/1977
DE      102015202907 A1     8/2015
(Continued)

OTHER PUBLICATIONS

International Search Report for PCT/EP2020/058967 mailed on Jun. 12, 2020.

*Primary Examiner* — Basia A Ridley
*Assistant Examiner* — Kimberly Wyluda
(74) *Attorney, Agent, or Firm* — Command IP LLP; Michael Zarrabian (57) ABSTRACT

The present invention relates to a battery arrangement, comprising a first battery unit and a second battery unit that is stacked in a stacking direction above the first battery unit, wherein a positioning element that extends in the stacking direction from the first battery unit to the second battery unit is provided for positioning the second battery unit relative to the first battery unit.

18 Claims, 5 Drawing Sheets

(51) Int. Cl.
  *H01M 50/242* (2021.01)
  *H01M 50/258* (2021.01)
  *H01M 50/289* (2021.01)
  *H01M 50/503* (2021.01)

(52) U.S. Cl.
  CPC ....... *H01M 50/258* (2021.01); *H01M 50/289* (2021.01); *H01M 50/503* (2021.01)

(56) References Cited

U.S. PATENT DOCUMENTS

| | | |
|---|---|---|
| 2004/0021442 A1* | 2/2004 | Higashino ........... H01M 10/647 320/112 |
| 2010/0178547 A1 | 7/2010 | Li |
| 2013/0071721 A1 | 3/2013 | Ogasawara et al. |
| 2013/0330587 A1 | 12/2013 | Takahashi et al. |
| 2014/0113172 A1 | 4/2014 | Enghardt |
| 2016/0372733 A1* | 12/2016 | Benedict ............. H01M 50/227 |
| 2017/0214014 A1 | 7/2017 | Yoon |
| 2018/0034121 A1 | 2/2018 | Kwon et al. |

FOREIGN PATENT DOCUMENTS

| | | |
|---|---|---|
| DE | 102018111662 A1 | 11/2018 |
| JP | 2014175078 A | 9/2014 |

\* cited by examiner

BATTERY ARRANGEMENT COMPRISING A POSITIONING ELEMENT AND ADAPTOR PLATE

CROSS-REFERENCE TO RELATED APPLICATIONS

This application is a 35 U.S.C. § 371 National Stage Entry of International Application No. PCT/EP2020/058967 filed Mar. 30, 2020, which claims the priority benefit of German Patent Application Serial Number DE 102019107991.8 filed Mar. 28, 2019, all of which are incorporated herein by reference in their entirety for all purposes.

TECHNICAL FIELD

The present invention relates to a battery arrangement for example a vehicle battery arrangement.

BACKGROUND

In the field of battery arrangements, for example vehicle batteries, it is known to assemble said battery arrangements from multiple battery units, wherein the individual battery units can for their part have a plurality of battery cells. Thus, the battery units that have multiple battery cells form high voltage units. These battery units are generally stacked one above the other in a stacking direction in a battery housing. In order to electrically interconnect or in other words contact, the individual stacked battery units to one another when assembling the battery arrangement, at present, flexible, electrically conductive connecting elements, mostly in the form of cables, are fed during the assembly procedure through openings of the individual battery units or through openings of the battery housing of the battery arrangement. Since these cables do not have a predetermined position and can change their orientation in a more or less unpredictable manner, this represents a safety risk both for the battery arrangement and in particular also for a person assembling the battery arrangement. This is all the more the case since the battery housing or the component that has the opening of the battery unit, for example a base of a battery unit, are mostly embodied from a conductive metal material.

Alternatively, a screw site can be provided on the busbar on the lower two battery units that are stacked one above the other. The busbar of the upper battery unit must then be fed through an opening in the region of the screw site, whereby short circuits can occur during the assembly procedure and this requires a larger installation space.

Moreover, when assembling conventional battery arrangements, additional effort is necessary so as to protect components of the battery arrangement and to protect the persons participating in the procedure of assembling the battery arrangement and technical devices and this additional outlay is reflected in an increased assembly time and in additional apparatuses for improving the function safety and the safety at work.

DISCLOSURE OF THE INVENTION

Based on the known prior art, it is an object of the present invention to provide an improved battery arrangement.

The object is achieved by means of a battery arrangement having the features of claim 1. Advantageous developments arise from the dependent claims, the description and the attached figures.

Accordingly, a battery arrangement is proposed, comprising a first battery unit and a second battery unit that is stacked in a stacking direction above the first battery unit, wherein a positioning element that extends in the stacking direction from the first battery unit to the second battery unit is provided for positioning the second battery unit relative to the first battery unit. In accordance with the invention, the positioning element can be displaced in a plane that extends in the perpendicular direction with respect to the stacking direction.

By virtue of the fact that for positioning the second battery unit relative to the first battery unit a positioning element that that extends in the stacking direction from the first battery unit in the direction of the second battery unit can be displaced in a plane that extends in the perpendicular direction with respect to the stacking direction, it is possible by means of the positioning element pre-position or position the second battery unit relative to the first battery unit during an assembly procedure. The displaceability renders it possible to significantly reduce or even completely avoid the risk that during the procedure of assembling the battery units the second battery unit becomes jammed for example between the positioning element and an external housing of the battery arrangement. In other words, on account of its displaceability in the plane that extends in the perpendicular direction with respect to the stacking direction, the positioning element can be adapted within specific predetermined limits to suit the second battery unit.

It is thus possible for example to compensate for manufacturing inaccuracies in the first battery unit and the second battery unit by way of the displaceable positioning element. In a similar manner, the requirements with respect to the tolerances of the first battery unit and the second battery unit for the procedure of assembling the battery arrangement can as a consequence be reduced in comparison to conventional battery arrangements.

In accordance with a preferred embodiment, the positioning element extends from the first battery unit through a positioning opening in a base element of the second battery unit in the direction of the second battery unit. As a consequence, it is possible to position the second battery unit relative to the first battery unit in a simple and safe manner.

In accordance with a further preferred embodiment, the positioning element is fastened to an adaptor plate that extends in the plane that extends in perpendicular direction with respect to the stacking direction, wherein the adaptor plate is arranged moveable in the plain perpendicular to the stacking direction. By providing the adaptor plate that is embodied in such a manner, it is possible to design the construction of the battery arrangement in a particularly simple manner. Moreover, the freedom of configuration with respect to the design of the connection between the first battery unit and the positioning element is increased since the adaptor plate renders it possible in a simple manner to use the installation space that is available in the first battery unit.

If the adaptor plate is embodied so as to be able to absorb forces in the stacking direction, it is possible to realize that during a procedure of assembling the first battery unit and the second battery unit the pressure that is applied in the stacking direction on the positioning element does not displace the positioning element in the stacking direction and thus hamper the positioning procedure. Moreover, the adaptor plate can as a consequence absorb any assembling forces between the first battery unit and the second battery unit and thus can contribute at least to reliably holding the second battery unit against the first battery unit or can assume this function completely.

Advantageously, the adaptor plate is connected to the first battery unit by way of at least one connecting rail, wherein the at least one connecting rail is embodied in a bend-resistant manner in the stacking direction and is embodied in a flexible manner in the perpendicular direction with respect to the stacking direction. As a consequence, the displaceability of the adaptor plate can be provided in a simple manner in the perpendicular direction with respect to with respect to the stacking direction.

In order to realize that the at least one connecting rail can absorb forces in the stacking direction without significantly bending and so as to ensure that the adaptor plate displaces in a simple or smooth manner in the perpendicular direction with respect to with respect to the stacking direction, the at least one connecting rail can have in the stacking direction a greater area moment of inertia than in the perpendicular direction with respect to the stacking direction, wherein it is preferred that the at least one connecting rail has a cross-section the length of which is greater in the stacking direction than its width in the perpendicular direction with respect to the stacking direction and the connecting rail has along its longitudinal extent at least one curvature about a curvature axis essentially parallel to the stacking direction.

In order to realize a particularly simple construction of the battery arrangement with particularly few parts required, the connecting rail can be embodied as a busbar so as to electrically contact the first battery unit and the adaptor plate and/or a contacting element of the adaptor plate. As a consequence, the connecting rail and thus optionally also the adaptor plate can moreover be used so as to make electrically contact with at least the second battery unit. The adaptor plate has for this purpose preferably an electrically conductive material.

In accordance with a further preferred embodiment, the positioning element comprises a contacting element that has at a first end a first contact area so as to electrically contact the first battery unit and at a second end said positioning element has a second contact area so as to electrically contact the second battery unit, wherein the contacting element is encompassed by an electrically insulating material between the first contact area and the second contact area. As a consequence, the positioning element can also provide in addition to the positioning function the function of providing an electrical contact between the first battery unit and the second battery unit, without additional components being necessary for this purpose. Moreover, it is possible as a consequence to also essentially forego additional protective devices or additional outlay for protecting the components of the battery arrangement or the persons who are participating in the assembly of the battery arrangement and technical devices, since the second contact area is always located with respect to the first contact area in a fixed position and by means of the electrically insulating material of the positioning element it is prevented that short circuits are inadvertently generated during a plugging-together procedure. Furthermore, a touch protection is provided by the electrically insulating material.

In accordance with a further preferred embodiment, the positioning element has an outer cross-sectional profile in the perpendicular direction with respect to the stacking direction, the shape of said profile being configured in such a manner that in addition to guiding the second battery unit in the stacking direction positioning of the second battery unit relative to the first battery unit is provided, preferably an angle positioning with regard to an angle that is enclosed by the projections of a longitudinal extent of the first battery unit and a longitudinal extent of the second battery unit onto the plane that extends in the perpendicular direction with respect to the stacking direction. As a consequence, it is ensured that the second battery unit is oriented with regard to the first battery unit always in a correct spatial position, or respectively the possibility of an incorrect positioning of the second battery unit relative to the first battery unit can be eliminated.

Moreover, in order to be able to provide a desired distance between the first battery unit and the second battery unit by way of the positioning element, the positioning element can have a shoulder for providing a predetermined distance between the first battery unit and the second battery unit, said shoulder being embodied in such a manner that the second battery unit, preferably a base element of the second battery unit, sits on the shoulder.

So that the procedure of inserting the apparatus into an opening of the second battery unit is facilitated during the procedure of assembling the second battery unit and the first battery unit, the positioning element can have at an end that is facing the second battery unit an insertion section that extends from the second end in the direction towards the first battery unit, wherein the insertion section preferably tapers in the direction towards the second battery unit, wherein the insertion section is preferably embodied at least in part in the shape of a frustum of a cone and/or in the shape of a frustum of a pyramid and/or has at least one chamfer.

It is preferred that the adaptor plate is embodied in such a manner that the adaptor plate is supported in the stacking direction with a side that is facing the first battery unit against the first battery unit, preferably against an electrically insulating section of the first battery unit. It is thus possible in a simple manner to ensure that forces in the stacking direction are absorbed by the adaptor plate and transmitted into the first battery unit. In addition, it is thus also ensured that the positioning element is not displaced in the stacking direction during a plugging-together procedure.

In accordance with a further preferred embodiment, the positioning element is arranged in a displaceable manner in the plane that extends in the perpendicular direction with respect to the stacking direction at least in a first direction at least in a predetermined region, wherein the positioning element is arranged in a displaceable manner in the plane that extends in the perpendicular direction with respect to the stacking direction preferably in the first direction and a second direction that extends in an orthogonal manner with respect to the first direction in each case at least in a predetermined region, and/or that the positioning element is arranged so as to be able to pivot at least in a predetermined angle range about the stacking direction. As a consequence, it can be rendered possible that the positioning element and/or the adaptor plate can be repositioned in such a manner that the second battery unit is prevented from jamming against the positioning element and/or against a housing of the battery arrangement. Thus, smaller manufacturing tolerances than in the case of conventional battery arrangements are also allowed for a procedure of assembling the battery arrangement or for plugging-together the battery arrangement.

In accordance with a further preferred embodiment, a plurality of positioning elements is provided, wherein at least two positioning elements are arranged on a common adaptor plate. As a consequence, the procedure of positioning the second battery unit relative to the first battery unit is once more improved.

The first battery unit and the second battery unit are preferably accommodated in a common battery housing with the result that it is possible to configure a compact battery arrangement.

In an alternative, the first battery unit and the second battery unit can also be accommodated in respectively separate battery housings, wherein the battery housings are then preferably stacked one above the other. As a consequence, it is possible to realize in a quasi-modular manner a construction of multiple separate battery units.

BRIEF DESCRIPTION OF THE FIGURES

Preferred further embodiments of the invention are explained in detail by the description below of the figures. In the drawings.

DETAILED DESCRIPTION OF PREFERRED EXEMPLARY EMBODIMENTS

Preferred exemplary embodiments are described below with reference to the figures. In so doing, like, similar or like-functioning elements are provided in the different figures with identical reference signs, and in part a repeated description of these elements is not provided in order to avoid redundancies.

Figure 1:
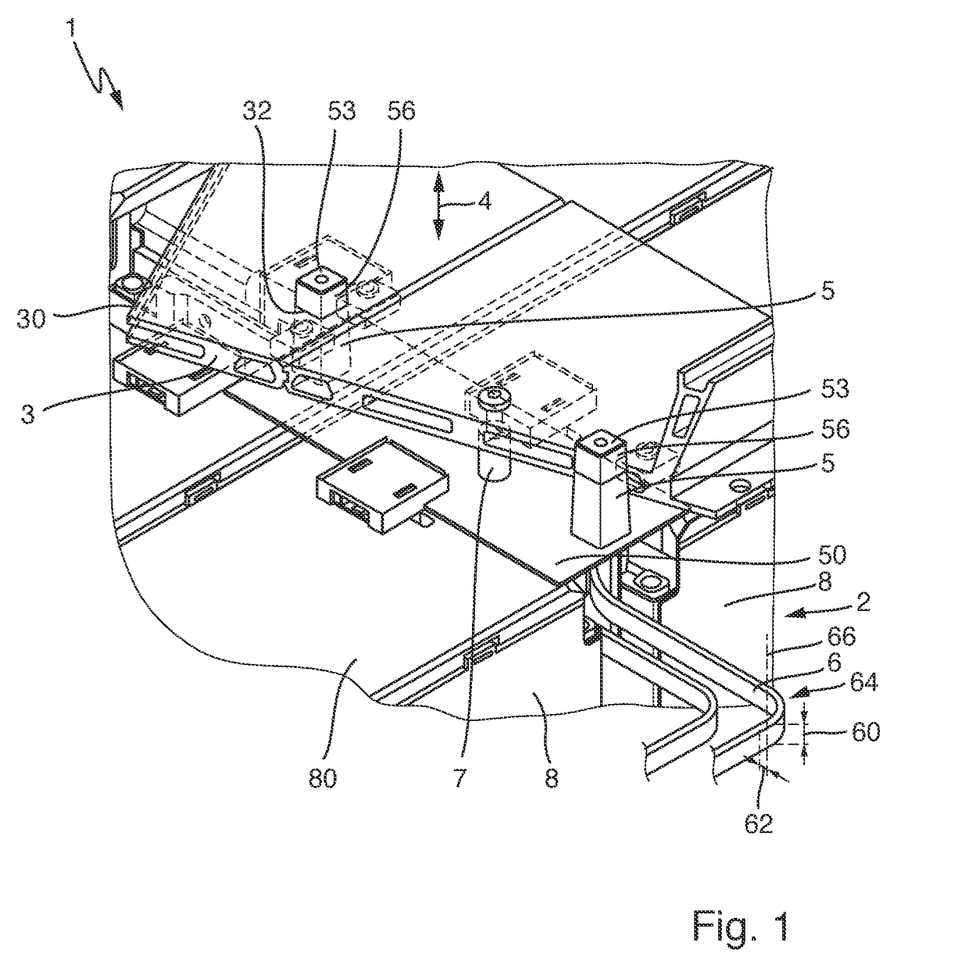
FIG. 1 illustrates schematically a detailed perspective view of a battery arrangement.

FIG. 1 illustrates schematically a perspective detailed view of a battery arrangement 1. The battery arrangement 1 comprises a first battery unit 2 and a second battery unit 3 that is stacked in a stacking direction 4 above the first battery unit 2. The second battery unit 3 is positioned relative to the first battery unit 2 by means of a positioning element 5. The positioning element 5 extends from the first battery unit 2 in the direction of the second battery unit 3 and can be displaced in a plane that extends in the perpendicular direction with respect to the stacking direction 4.

For the sake of clarity, a base element 30 of the second battery arrangement 3 is illustrated here in a sectioned and translucent manner.

The first battery unit 2 and the second battery unit 3 can each be accommodated in dedicated battery housings with the result that the base element 30 can then correspond to a base area of the upper battery housing.

The first battery unit 2 and the second battery unit 3 can however also be accommodated in a common battery housing with the result that the base element 30 can then also correspond for example to a tempering element for tempering the respective battery unit.

In the present case, the battery arrangement 1 has a plurality of positioning elements 5. The positioning elements 5 extend in each case through a positioning opening 32 of the base element 30.

The base element 30 is moreover fastened to the adaptor plate 50 via a fastening element 7.

As is apparent in FIG. 1, two positioning elements 5 are fastened to a common adaptor plate 50. The adaptor plate 50 is arranged in the plane so as to be able to move in the perpendicular direction with respect to the stacking direction 4. As a consequence, it is ensured that the individual positioning elements 5 are able to move.

The adaptor plate 50 is moreover embodied in order to be able to absorb forces in the stacking direction 4. For this purpose, the adaptor plate 50 is connected to the first battery unit 2 by way of connecting rails, wherein the connecting rails 6 are embodied in a bend-resistant manner in the stacking direction 4 and are embodied in a flexible manner in the perpendicular direction with respect to the stacking direction 4.

In order to realize the above mentioned, the connecting rails 6 are embodied in such a manner that they have a greater area moment of inertia in the stacking direction 4 than in the perpendicular direction with respect to the stacking direction 4, for this purpose the connecting rails 6 have in each case a cross-section the length 60 of which is greater in the stacking direction 4 than its width 62 in the perpendicular direction with respect to the stacking direction 4. Moreover, each connecting rail 6 has along its longitudinal extent at least one curvature 64 about a curvature axis 66 essentially parallel to the stacking direction 4.

As a consequence, the adaptor plate 50 and consequently also the positioning elements 5 are arranged in a displaceable manner in the plane that extends in the perpendicular direction with respect to the stacking direction 4 in a first direction at least in a predetermined region and in a second direction that extends in an orthogonal manner with respect to the first direction in a predetermined region, in addition, as a consequence the adaptor plate 50 and consequently the positioning element 5 can pivot in a predetermined angle range about the stacking direction 4.

In accordance with this embodiment, at least one connecting rail 6 is embodied as a busbar so as to electrically contact the first battery unit 2 and the adaptor plate 50.

The positioning elements 5 comprise moreover a contacting element that has at a first end a first contact area for electrically contacting the first battery unit 2 and at a second end said positioning element has a second contact area for electrically contacting the second battery unit 3, wherein the contacting element between the first contact area and the second contact area 53 is encompassed by an electrically insulating material, as is later described in detail with reference to FIG. 4.

The positioning elements 5 have an outer cross-sectional profile in the perpendicular direction with respect to the stacking direction 4, the shape of said profile being configured in such a manner that in addition to guiding the second battery unit 3 in the stacking direction 4 it is possible to position the second battery unit 3 relative to the first battery unit 2 in terms of an angle positioning with regard to an angle that is enclosed by the projections of a longitudinal extent of the first battery unit 2 and a longitudinal extent of the second battery unit 3 on to the plane that extends in the perpendicular direction with respect to the stacking direction 3.

In order to render it possible to perform a positioning procedure in a simple manner, each positioning element 5 has at an end that is facing the second battery unit 3 an insertion section 56 that extends from the second end in the direction towards the first battery unit 2, said insertion section tapers in the direction towards the second battery unit 3, wherein the insertion section 56 is embodied in the present case in the shape of a frustum of a cone.

The adaptor plate 50 can be supported in the stacking direction 4 with a side that is facing the first battery unit 2 optionally against the first battery unit 2 against an electrically insulating section in the form of a cover plate 80 of the first battery unit 2.

Figure 2:
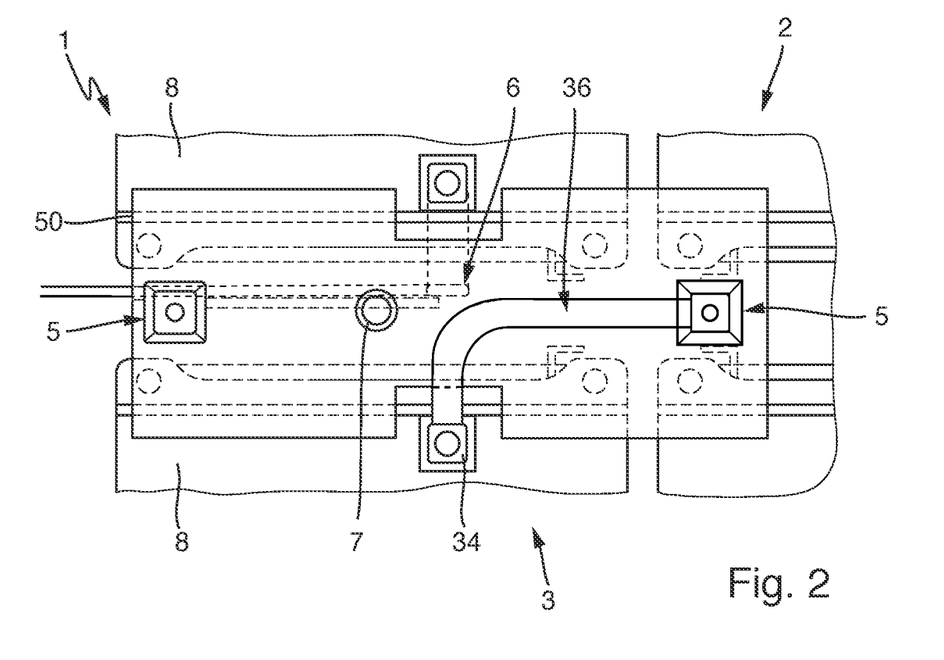
FIG. 2 illustrates schematically a plan view of the battery arrangement shown in FIG. 1.

FIG. 2 illustrates schematically a plan view of the battery arrangement 1 shown in FIG. 1. In order to be able to electrically contact the first battery unit 2 to the second battery unit 3, a busbar 36 is arranged between the positioning element 5 and a contacting element 34 of the second battery unit 3.

Figure 3:
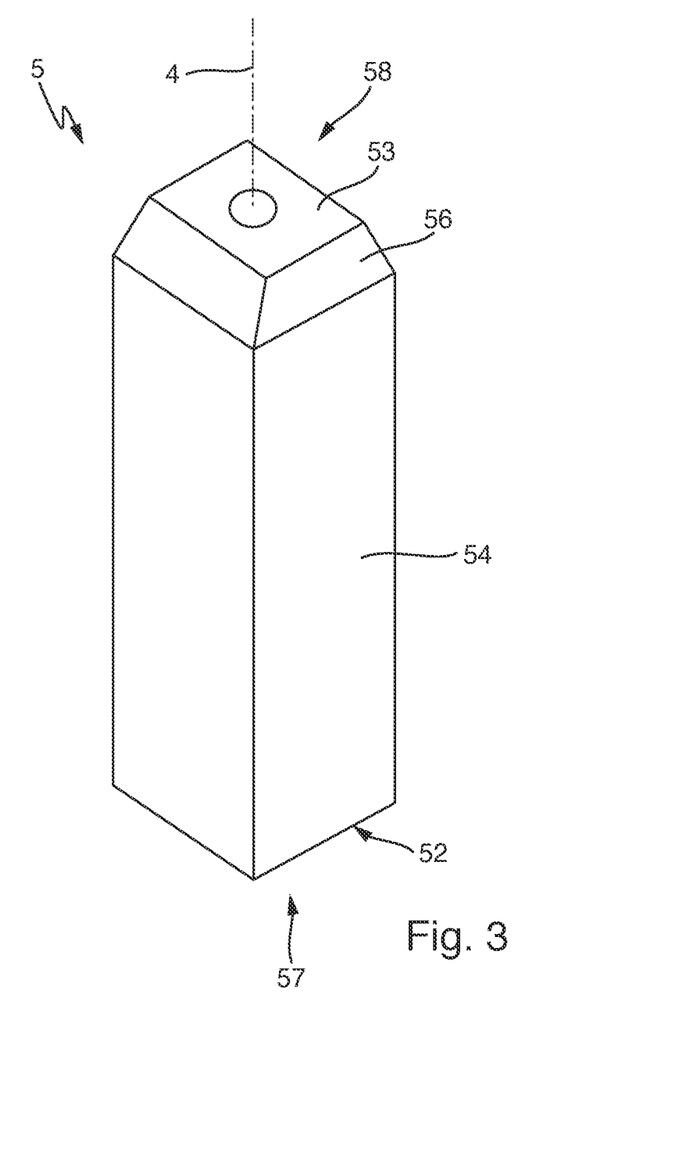
FIG. 3 illustrates a perspective side view of a positioning element of the battery arrangement shown in FIG. 1.

FIG. 3 illustrates a perspective side view of a positioning element 5 of the battery arrangement 1 shown in FIG. 1, in which the insertion section 56 can once again be considered in detail.

Figure 4:
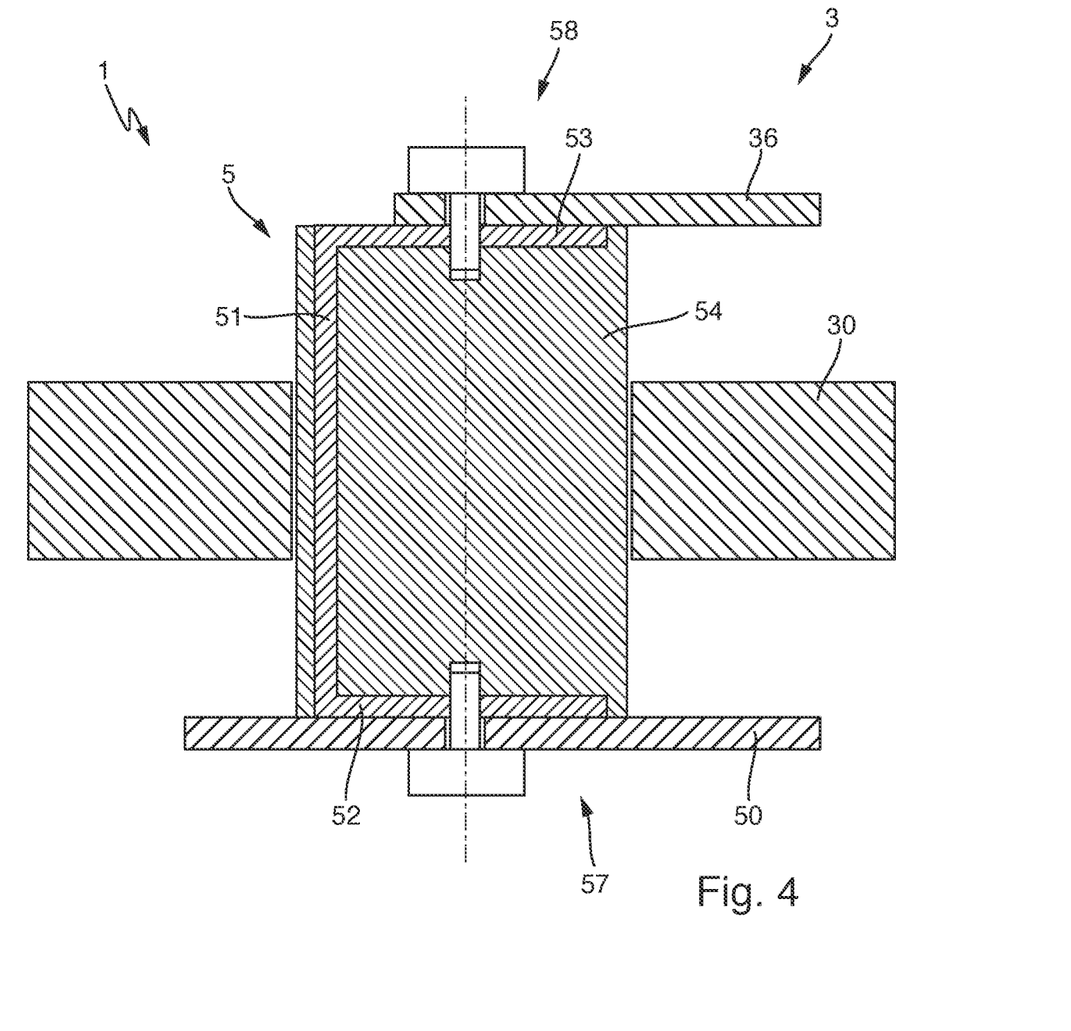
FIG. 4 illustrates schematically a sectional view through the battery arrangement shown in FIG. 1 in the region of a positioning element.

FIG. 4 illustrates schematically a sectional view through the battery arrangement 1 shown in FIG. 1 in the region of a positioning element 5. It is clearly apparent here that the contacting element 51 extends from an end 57 to the second end 58 and on the wherein it has at the first end 57 the first contact area 52 with which it electrically contacts the adaptor plate 50 and consequently the first battery unit 2, and it has at the second end 58 the second contact area 53 with which it electrically contacts the second battery unit 3 via the busbar 36. Moreover, it is clearly apparent that the contacting element 51 between the first contact area 52 and the second contact area 53 is encompassed by the electrically insulating material 54.

For reasons of clarity, the insertion section 56 is not illustrated in this case in the figure.

Figure 5:
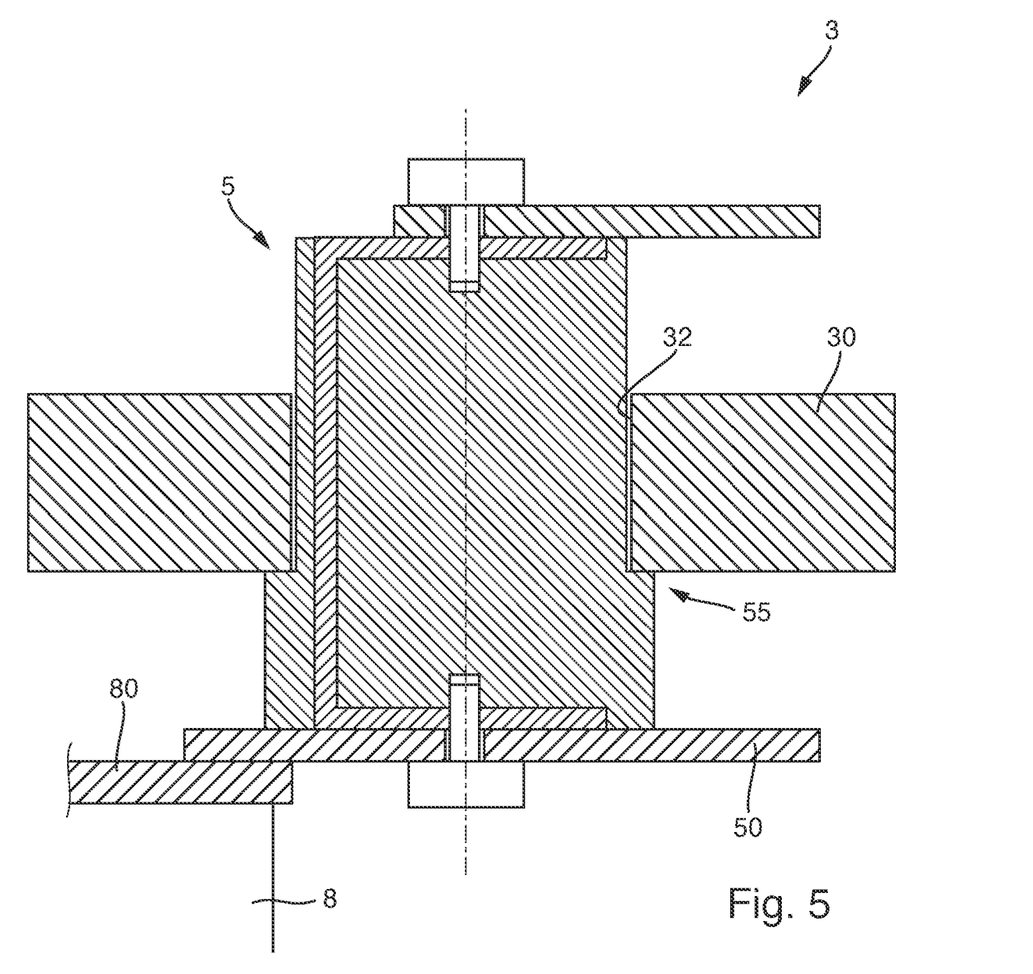
FIG. 5 illustrates schematically a sectional view through a battery arrangement in accordance with a further embodiment.

FIG. 5 illustrates schematically a sectional view through a battery arrangement 1 in accordance with a further embodiment. Said arrangement corresponds essentially to that shown in FIG. 4, wherein the positioning element 5 has in this case moreover a shoulder 55 which provides a predetermined distance between the first battery unit 2 and the second battery unit 3. The shoulder 55 is embodied in this case in such a manner that the second battery unit 3 sits by means of its base element 30 on the shoulder 55.

Where applicable, all individual features that are illustrated in the exemplary embodiments can be combined with one another and/or exchanged without abandoning the scope of the invention.

LIST OF REFERENCE NUMERALS

1 Battery arrangement
2 First battery unit
3 Second battery unit
30 Base element
32 Positioning opening
34 Contacting element
36 Busbar
4 Stacking direction
5 Positioning element
50 Adaptor plate
51 Contacting element
52 First contact area
53 Second contact area
54 Electrically insulating material
55 Shoulder
56 Insertion section
57 First end
58 Second end
6 Connecting rail
60 Length
62 Width
64 Curvature
66 Curvature axis
7 Fastening element
8 Battery module
80 Cover plate

The invention claimed is:

1. A battery arrangement, comprising a first battery unit and a second battery unit that is stacked in a stacking direction above the first battery unit, wherein a positioning element that extends in the stacking direction from the first battery unit to the second battery unit is provided for positioning the second battery unit relative to the first battery unit, wherein the positioning element is configured to be displaced in a plane that extends in the perpendicular direction with respect to the stacking direction, wherein the positioning element is fastened to an adaptor plate that extends in the perpendicular direction with respect to the stacking direction, wherein the adaptor plate is arranged moveable in the plane perpendicular to the stacking direction, and wherein the positioning element extends from the first battery unit through a positioning opening in a base element of the second battery unit in the direction of the second battery unit.

2. The battery arrangement as claimed in claim 1, wherein the adaptor plate is embodied in order to be able to absorb forces in the stacking direction.

3. The battery arrangement as claimed in claim 1, wherein the adaptor plate is connected to the first battery unit by way of at least one connecting rail, wherein the at least one connecting rail is embodied in a bend-resistant manner in the stacking direction and is embodied in a flexible manner in the perpendicular direction with respect to the stacking direction.

4. The battery arrangement as claimed in claim 3, wherein the at least one connecting rail has in the stacking direction a greater area moment of inertia than in the perpendicular direction with respect to the stacking direction, wherein the at least one connecting rail has a cross-section, the length of which is greater in the stacking direction than its width in the perpendicular direction with respect to the stacking direction, and the connecting rail has along its longitudinal extent at least one curvature about a curvature axis essentially parallel to the stacking direction.

5. The battery arrangement as claimed in claim 4, wherein the connecting rail is embodied as a busbar so as to electrically contact the first battery unit and the adaptor plate.

6. The battery arrangement as claimed in claim 5, wherein the positioning element comprises a contacting element that has at a first end a first contact area so as to electrically contact the first battery unit and at a second end said positioning element has a second contact area so as to electrically contact the second battery unit, wherein the contacting element is encompassed by an electrically insulating material between the first contact area and the second contact area.

7. The battery arrangement as claimed in claim 6, wherein the positioning element has an outer cross-sectional profile in the perpendicular direction with respect to the stacking direction, the shape of said profile being configured in such a manner that in addition to guiding the second battery unit in the stacking direction positioning the second battery unit relative to the first battery unit, an angle positioning with regard to an angle that is enclosed by the projections of a longitudinal extent of the first battery unit and a longitudinal extent of the second battery unit onto the plane that extends in the perpendicular direction with respect to the stacking direction, is provided.

8. The battery arrangement as claimed in claim 7, wherein the positioning element has a shoulder for providing a predetermined distance between the first battery unit and the second battery unit, which is embodied in such a manner that the second battery unit sits on the shoulder.

9. The battery arrangement as claimed in claim 8, wherein the positioning element has at an end that is facing the second battery unit an insertion section that extends from the second end in a direction towards the first battery unit, wherein the insertion section tapers in a direction towards the end that is facing the second battery unit, wherein the insertion section is embodied at least in part in the shape of at least one of: a frustum of a cone, a frustum of a pyramid, and has at least one chamfer.

10. The battery arrangement as claimed in claim 9, wherein the adaptor plate is supported in the stacking direction with a side that is facing the first battery unit against the first battery unit.

11. The battery arrangement as claimed in claim 10, wherein the positioning element is arranged in a displaceable manner in the plane that extends in the perpendicular direction with respect to the stacking direction at least in a first direction at least in a predetermined region and a second direction that extends in an orthogonal manner with respect to the first direction at least in a predetermined region.

12. The battery arrangement as claimed in claim 11, wherein a plurality of positioning elements is provided, wherein at least two positioning elements are arranged on a common adaptor plate.

13. The battery arrangement as claimed in claim 12, wherein at least one of: the first battery unit and the second battery unit are accommodated in a common battery housing and the first battery unit and the second battery unit are accommodated in respectively separate battery housings, wherein the battery housings are stacked one above the other.

14. The battery arrangement as claimed in claim 10, wherein the positioning element is arranged so as to be able to pivot about the stacking direction at least in a predetermined angle range.

15. The battery arrangement as claimed in claim 9, wherein the adaptor plate is supported in the stacking direction with a side that is facing the first battery unit, against an electrically insulating section of the first battery unit.

16. The battery arrangement as claimed in claim 8, wherein the base element of the second battery unit sits on the shoulder.

17. The battery arrangement as claimed in claim 4, wherein the connecting rail is embodied as a busbar so as to electrically contact the first battery unit and a contacting element of the adaptor plate.

18. A battery arrangement, comprising a first battery unit and a second battery unit that is stacked in a stacking direction above the first battery unit, wherein a positioning element that extends in the stacking direction from the first battery unit to the second battery unit is provided for positioning the second battery unit relative to the first battery unit, wherein the positioning element is configured to be displaced in a plane that extends in the perpendicular direction with respect to the stacking direction, wherein the positioning element is fastened to an adaptor plate that extends in the perpendicular direction with respect to the stacking direction, wherein the adaptor plate is arranged moveable in the plane perpendicular to the stacking direction, wherein the adaptor plate is connected to the first battery unit by way of at least one connecting rail, wherein the at least one connecting rail is embodied in a bend-resistant manner in the stacking direction and is embodied in a flexible manner in the perpendicular direction with respect to the stacking direction.

* * * * *